United States Patent [19]
Crowley

[11] 3,733,788
[45] May 22, 1973

[54] APPARATUS FOR REMOVING PARTICULATE AND GASEOUS POLLUTANTS FROM STACK SMOKE

[76] Inventor: William A. Crowley, 8418-52 Avenue, Elmhurst, N.Y. 11373

[22] Filed: May 10, 1972

[21] Appl. No.: 251,941

[52] U.S. Cl. .................. 55/228, 55/260, 110/119, 261/118, 261/126
[51] Int. Cl. .............................. B01d 47/06
[58] Field of Search .................. 55/228, 260; 261/118, 126; 210/196, 195; 110/119

[56] References Cited
UNITED STATES PATENTS

| | | | |
|---|---|---|---|
| 587,425 | 8/1897 | Briggs | 261/126 |
| 1,799,084 | 3/1931 | Brdar | 261/17 |
| 2,653,674 | 9/1953 | Ortgies | 261/117 |
| 2,668,754 | 2/1954 | Lichtenfels | 55/94 |
| 3,487,620 | 1/1970 | Klein et al. | 55/222 |
| 3,616,610 | 11/1971 | Javorsky et al. | 55/260 |

*Primary Examiner*—Bernard Nozick
*Attorney*—Marvin Feldman et al.

[57] ABSTRACT

Apparatus for cleaning a stack smoke by removing particulate and gaseous pollutants therefrom, having a conduit in the stack for conducting the stack smoke therethrough and a conical deflector spaced above and across the top of the conduit to provide an annular passage for the stack smoke and a nozzle to deliver a curtain of water transversely to the direction of the deflected stack smoke to remove pollutants, the water then flowing to a collection tank and outlet line for discharge from the stack.

10 Claims, 2 Drawing Figures

APPARATUS FOR REMOVING PARTICULATE AND GASEOUS POLLUTANTS FROM STACK SMOKE

This invention relates to apparatus for cleaning a stack smoke.

More specifically this invention relates to apparatus for removing particulate and gaseous pollutants from a stack smoke.

It is an object of this invention to provide an apparatus which is adapted to be mounted in an exhaust stack and which is adapted to provide a flow of liquid to the stack smoke for removal of particulate and gaseous pollutants therefrom.

It is a further object of this invention to provide apparatus as aforesaid whereby the liquid is treated to separate out removed pollutants and the treated liquid is then recirculated to the system for efficient and economical operation.

It is still a further object of this invention to provide apparatus as aforesaid whereby stack smoke is deflected and baffled so that a curtain of liquid passes transversely therethrough to effectively clean the stack smoke.

It is still a further object of this invention to provide apparatus as aforesaid which is readily, adaptably mounted in an exhaust stack.

It is still a further object of this invention to provide an apparatus for removing particulate and gaseous pollutants from stack smoke which may be readily and inexpensively manufactured.

Figure 2:
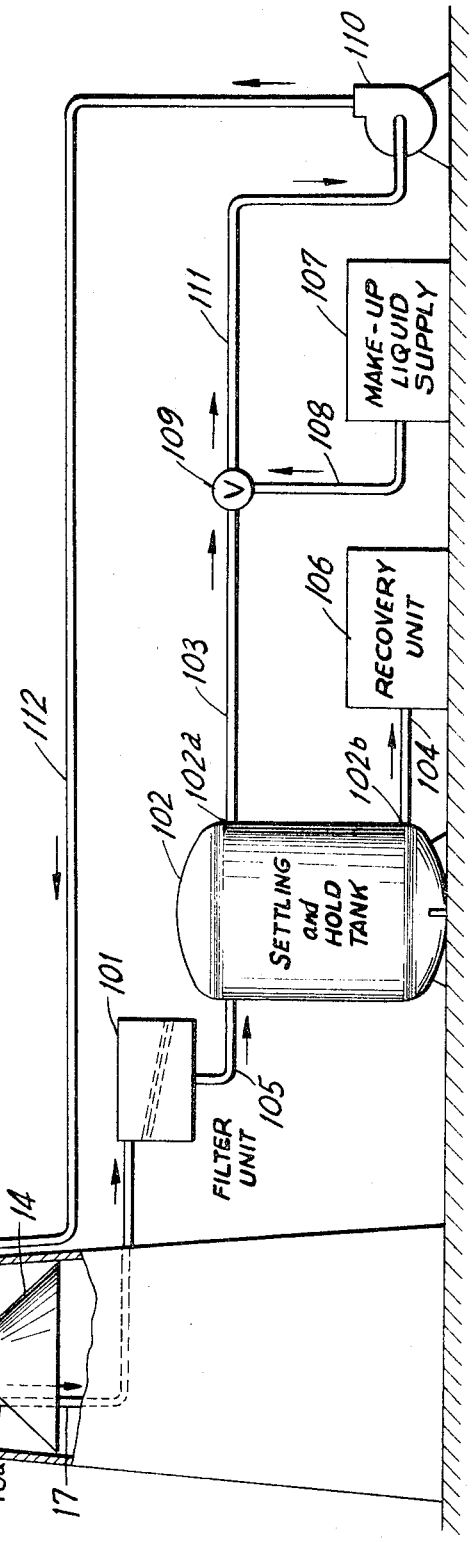
Figure 2:
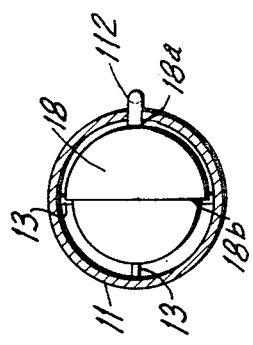
Figure 1:
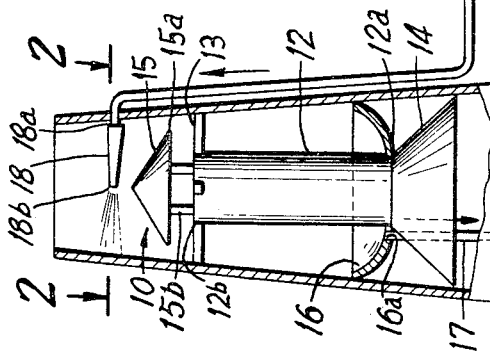

Other objects of this invention and several advantages and the characteristics of the apparatus of this invention will become apparent from the following specification and appended claims and the accompanying drawings wherein:

FIG. 1 is an elevational schematic view of the apparatus of this invention in an exhaust stack, and FIG. 2 is a cross-sectional view of the apparatus taken along line 2—2 of FIG. 1.

Referring to FIG. 1 there is shown the smoke cleaning unit 10 housed within an exhaust stack 11. The smoke cleaning unit 10 comprises a hollow elongated cylindrical conduit section 12, vertically, centrally disposed within exhaust stack 11. Conduit section 12 is fixedly and spacedly supported from the interior of the exhaust stack by means of four support members 13 (typical). An outwardly flared frusto-conical conduit section 14 is integrally formed with and at the bottom end 12a of the cylindrical conduit 12. The frusto-conical section extends outwardly to the inside of the stack and may be fixedly attached thereto. Spacedly housed above the top end 12b of the cylindrical conduit section 12, is a conical deflector 15. Said deflector extends downwardly, outwardly across the top end 12b of cylindrical conduit 12 and the edge 15a thereof terminates inwardly of the inside of stack 11, so that edge 15a and stack 11 form an annular passage for exhaust stack smoke. The deflector 15 is spacedly mounted to and above the conduit top end 12b by mounting brackets 15b (typical).

A water collection section 16 is of an annular dish configuration fitted between the inside of stack 11 and the outside of cylindrical conduit section 12. At the lowest point of the collection section is discharge orifice 16a for receiving a discharge pipe 17, for gravity discharge of pollutant-laden water.

Mounted above the conical deflector 15 and transversely disposed in the stack is a water discharge nozzle 18 for delivering water under pressure into the stack. The nozzle is preferably of semi-cylindrical configuration and a reduction type (See FIG. 2). By the term reduction type it is meant, that the upstream or inlet orifice is of about 4 inch circular diameter and the downstream orifice is a horizontal slot, the vertical opening thereof being of about 0.5 inch by way of example.

In operation stack smoke containing gaseous and particulate pollutants leaves a fire-box (not shown) and travels upwardly through the stack. The stack smoke first enters the frusto-conical section 14 and then passes upwardly through the vertical conduit section 12 and exits the conduit at the top thereof. Thereafter the stack smoke is deflected by conical deflector 15 outwardly and upwardly through the aforesaid annular passage. A portion of the smoke then flows beneath, across the bottom and in the front of the orifice 18b nozzle 18 and the remainder of the smoke passes more directly in front the orifice 18b.

Nozzle 18 delivers a curtain of water transversely to the flow of deflected stack smoke, said curtain of water impinging on the inside wall of the stack opposing the nozzle 18. In this manner the stack smoke and water inter-mix and the pollutants are transferred from the smoke to the water. Gaseous pollutants are dissolved in the water, while particulates are entrained therein.

The pollutant-laden water then flows downward to the collection section 16 and outward from stack 11 by means of discharge pipe 17.

The discharged water flows through line 105 to a liquid-solid filter unit operation 101 preferably of a screen-type whereat solid particulates are filtered-out from the discharged water. The filtered liquid then passes to a settling and hold tank 102 where at particulates not removed in filtering are settled-out and the clear filtered water discharged through line 103 near the top 102a tank 102. At the lower part 102b of the tank 102 is a discharge line 104 whereat the settled water passes therethrough to a recovery unit 106 whereat the water is treated to remove gaseous and particulate pollutants. The treated refreshed water may then if desired be returned to the system.

For a recirculation system, to compensate for water removed from tank 102, make-up water is supplied from storage supply unit 107. As shown the make-up water in line 108 and the clear filtered water from tank 103 may be automatically proportionally admixed by means of control valve 109. In this manner the amount of residual pollutants recirculated to stack 11 is minimized to the desirably tolerable level. The admixed streams pass from valve 109 through pipe line 111 to centrifugal pump 110 to be pressurized for flow through pipe line 112 to the discharge nozzle 18 in stack 11. In the foregoing discussion the direction of water flow is indicated by the arrows, in FIGS. 1 and 2.

In an alternative embodiment of this invention, a baffle horizontally disposed in the stack and spacedly located between the conical deflector and the nozzle may be employed to ensure the desired flow direction of the stack smoke to transverse the curtain of water from the nozzle.

The liquid employed to treat the stack gas is normally water but may be any other suitable liquid, preferably an aqueous liquid. It is desirous that the liquid be highly non-volatile and a good solvent for noxious pollutants gases present in the stack smoke.

Exhaust stack smoke generally contains noxious gaseous combustion products of any sulfur contained in the fuel. These noxious gaseous combustion products are principally sulfur containing gases such as hydrogen sulfide, sulfur dioxide and sulfur trioxide, which are to varying degrees soluble in aqueous media. Thus when the liquid employed pursuant to the practice of this invention is water or another aqueous liquid, the aforesaid soluble noxious gases are dissolved therein and then discharged from the stack.

To reduce operating costs it is often desirable to recirculate the liquid discharged from the stack. Insofar as the discharged liquid contains particulate pollutants, such as dust and fly ash and also contains dissolved sulfur-containing gases as aforesaid, separation and recovery operations must be performed to remove at least a portion of the particulate and gaseous pollutants. These separation and recovery operations are generally required to avoid pollutant saturation of the water recirculation system.

Suitable separation operations for the particulate pollutants are by way of example, filtering, settling, coagulation and other liquid-solid separation operations.

Suitable separation operations for the dissolved gaseous pollutants are by way of example, steam-stripping-,solvent-stripping, chemical precipitation, and the like.

In addition to cleaning the stack smoke of dust, fly ash, sout and other foreign particles the apparatus of this invention serves to suppress or quench any sparks in the gas.

Further, to improve the degree of solubility of the aforesaid noxious gases in the liquid, it is desirable that the liquid and stack smoke be cooled prior to contact. Therefore means to cool the liquid prior to entering the stack may be provided as well as means to cool the stack smoke prior to entering the conduit of the apparatus of this invention may also be provided.

The foregoing described embodiment is illustrative and not to be construed as restricted to the details set forth therein since these details may be modified without departing from the spirit and scope of the invention.

I claim:

1. An apparatus for cleaning stack smoke by removing particulate and gaseous pollutants therefrom, comprising, a stack, an elongated conduit vertically disposed in said stack, means to direct smoke to the bottom of said vertically disposed conduit, a deflector spacedly housed above the top of said elongated conduit and extending outwardly across the top of the elongated conduit and terminating inwardly of the inner surface of said stack to form an annular passage for the stack smoke, a nozzle mounted horizontally and spacedly disposed within the stack at a level above said deflector and below the top of said stack and at one side of the interior of the stack, said nozzle being formed with an elongated disposed discharge orifice means, the elongated orifice dimension of said discharge orifice means extending horizontally and being equal to about the dimension across the inside of said stack at said level, said orifice means including means to deliver a continuous curtain of liquid to transversely contact the deflected smoke and then impinge on a portion of the inner side wall of the stack opposing said nozzle, means to collect said liquid, comprising an annular trough disposed between the inner surface of said stack and the outer surface of said elongated conduit and means connecting said trough to said stack and to said conduit to cause said liquid to deposit in said trough, and pipe means integrally formed and communicating with said annular trough to discharge said collected liquid.

2. The apparatus of claim 1, wherein said means to direct said smoke to said elongated conduit is a downwardly, outwardly flared frusto-conical section integrally formed at and with the lower end of said elongated conduit.

3. The apparatus of claim 1, further comprising a filter for particulates to filter the discharged liquid.

4. The apparatus of claim 1, said nozzle being transversely disposed in said stack and covers about one-half of the stack.

5. The apparatus of claim 1, and means associated with said nozzle and transversely disposed in said stack to direct the stack smoke between said elongated horizontally disposed discharge orifice means of the nozzle and an opposite side of said stack.

6. The apparatus of claim 1, said stack being of circular transverse cross section and the horizontal dimension of said orifice means being about equal to the inside diameter of the stack at the level of said nozzle.

7. The combination of claim 1, said stack being circular in transverse cross-section, said nozzle being semicircular in transverse cross-section, said discharge orifice means being diametrical and the semi-circular part of said nozzle contacting the interior of said stack at the level of the nozzle.

8. The combination of claim 1, the cross-sectional internal area of the smoke stack at the level of the nozzle, being substantially covered by nozzle and continuous curtain of liquid discharged from said orifice means.

9. The apparatus of claim 1 said orifice means comprising a continuous slot.

10. The combination of claim 9, said slot being no greater than about 0.5 inch in vertical dimension.

* * * * *